United States Patent
Brehler et al.

(10) Patent No.: US 8,494,065 B2
(45) Date of Patent: Jul. 23, 2013

(54) INTERFERENCE REDUCTION BETWEEN OFDM CARRIERS BY FREQUENCY OFFSET OPTIMIZATION

(75) Inventors: Matthias Brehler, Boulder, CO (US); Brian C. Banister, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 763 days.

(21) Appl. No.: 12/479,553

(22) Filed: Jun. 5, 2009

(65) Prior Publication Data

US 2009/0304100 A1 Dec. 10, 2009

Related U.S. Application Data

(60) Provisional application No. 61/059,859, filed on Jun. 9, 2008.

(51) Int. Cl.
*H04K 1/10* (2006.01)
*H04L 27/28* (2006.01)

(52) U.S. Cl.
USPC ........... 375/260; 375/285; 375/296; 375/316; 375/346; 375/386

(58) Field of Classification Search
USPC .................. 375/260, 285, 296, 316, 346, 348
See application file for complete search history.

(56) References Cited

U.S. PATENT DOCUMENTS

| | | | |
|---|---|---|---|
| 7,158,475 B1 | 1/2007 | Ikeda et al. | |
| 7,260,054 B2 | 8/2007 | Olszewski | |
| 7,386,306 B2 | 6/2008 | Laroia et al. | |
| 7,801,227 B2 * | 9/2010 | Parizhisky et al. | 375/260 |
| 7,969,858 B2 | 6/2011 | Laroia et al. | |
| 8,068,841 B2 | 11/2011 | Laroia et al. | |
| 2005/0233752 A1 * | 10/2005 | Laroia et al. | 455/450 |
| 2006/0083267 A1 * | 4/2006 | Laroia et al. | 370/503 |
| 2007/0242756 A1 * | 10/2007 | Nakagawa et al. | 375/253 |
| 2008/0019315 A1 | 1/2008 | Machida | |
| 2008/0063101 A1 | 3/2008 | Cimini, Jr. et al. | |
| 2010/0178877 A1 | 7/2010 | Matsumoto | |

FOREIGN PATENT DOCUMENTS

| | | |
|---|---|---|
| CN | 101136894 A | 3/2008 |
| JP | 2000269917 A | 9/2000 |
| JP | 2006352379 A | 12/2006 |

(Continued)

OTHER PUBLICATIONS

International Search Report and Written Opinion—PCT/US2009/046785—ISA/EPO—Mar. 22, 2010.

(Continued)

*Primary Examiner* — Ted Wang
(74) *Attorney, Agent, or Firm* — Kam T. Tam

(57) ABSTRACT

Systems and methodologies are described that facilitate signal separation across different carriers within a wireless communications environment. The systems and methods can identify a carrier spacing that can be based upon a tone spacing associated with two or more carriers. Such carrier spacing can be employed within a network in order to mitigate signal separation with multiple carriers. The subject innovation can further evaluate a carrier raster associated with a network in order to identify a carrier spacing to ensure orthogonality between tones from different carriers.

40 Claims, 11 Drawing Sheets

FOREIGN PATENT DOCUMENTS

| | | |
|---|---|---|
| JP | 2007533256 | 11/2007 |
| JP | 2008028445 A | 2/2008 |
| JP | 2008517532 A | 5/2008 |
| RU | 2268547 C2 | 1/2006 |
| WO | WO03092197 A1 | 11/2003 |
| WO | 2006044487 | 4/2006 |
| WO | 2007142194 A1 | 12/2007 |
| WO | WO2008096436 A1 | 8/2008 |
| WO | WO2008118429 A1 | 10/2008 |

OTHER PUBLICATIONS

Lui G L: "FDMA system performance with synchronization errors" IEEE, US Military.
Communications Conference, 1996. Milcom 96, Conference Proceedings, vol. 3, Oct. 21, 1996, pp. 811-818, XP010204013, New York, NY, USA ISBN: 978-0-7803-3682-7 section 2.
Taiwan Search Report—TW098119069—TIPO—Oct. 8, 2012.

* cited by examiner

INTERFERENCE REDUCTION BETWEEN OFDM CARRIERS BY FREQUENCY OFFSET OPTIMIZATION

CROSS-REFERENCE TO RELATED APPLICATIONS

This application claims the benefit of U.S. Provisional Patent application Ser. No. 61/059,859 entitled "OFDM FREQUENCY OFFSET OPTIMIZATION" which was filed Jun. 9, 2008. The entirety of the aforementioned application is herein incorporated by reference.

BACKGROUND

I. Field

The following description relates generally to wireless communications, and more particularly to frequency offset between adjacent carriers.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Orthogonal Frequency Division Multiplex systems use a set of individual frequency tones to carry modulated information. The tones are made orthogonal by a certain relationship between the time duration of the useful part of the OFDM symbol and the offset between the tone frequencies. To keep all tones orthogonal, the symbol duration, before the cyclic prefix insertion, is typically chosen to be the reciprocal of the tone spacing, which is the frequency offset between adjacent tones. As long as two signals occupying different set of tones are received with small time offsets, the orthogonality between the composite signals can be maintained.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates separating signals within a wireless communications environment. The method can include verifying an Orthogonal Frequency-Division Multiplexing (OFDM) symbol duration between two or more carriers associated with an OFDM network, wherein verifying ensures a matching between the OFDM symbol duration between two or more carriers. Further, the method can include employing a time synchronization to ensure signal receipt from the two or more carriers have a minimal time offset. Moreover, the method can comprise receiving a tone spacing from the two or more carriers. The method can additionally include implementing a carrier spacing for the two or more carriers, wherein the carrier spacing is an integer multiple of the tone spacing.

Another aspect relates to a wireless communications apparatus. The wireless communications apparatus can include at least one processor configured to verify an Orthogonal Frequency-Division Multiplexing (OFDM) symbol duration between two or more carriers, employ a time synchronization to ensure signal receipt from the two or more carriers have a minimal time offset, receive a tone spacing from the two or more carriers and implement a carrier spacing for the two or more carriers, wherein the carrier spacing is an integer multiple of the tone spacing. Further, the wireless communications apparatus can include memory coupled to the at least one processor.

Yet another aspect relates to a wireless communications apparatus that enables separation of signals within a wireless communications environment. The wireless communications apparatus can include means for verifying an Orthogonal Frequency-Division Multiplexing (OFDM) symbol duration between two or more carriers associated with an OFDM network. Additionally, the wireless communications apparatus can comprise means for employing a time synchronization to ensure signal receipt from the two or more carriers have a minimal time offset. Further, the wireless communications apparatus can comprise means for receiving a tone spacing from the two or more carriers. Moreover, the wireless communications apparatus can comprise means for implementing a carrier spacing for the two or more carriers, wherein the carrier spacing is an integer multiple of the tone spacing.

Still another aspect relates to a computer program product comprising a computer-readable medium having stored thereon code for causing a computer to verify an Orthogonal Frequency-Division Multiplexing (OFDM) symbol duration between two or more carriers, employ a time synchronization to ensure signal receipt from the two or more carriers have a minimal time offset, receive a tone spacing from the two or more carriers, and implement a carrier spacing for the two or more carriers, wherein the carrier spacing is an integer multiple of the tone spacing.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
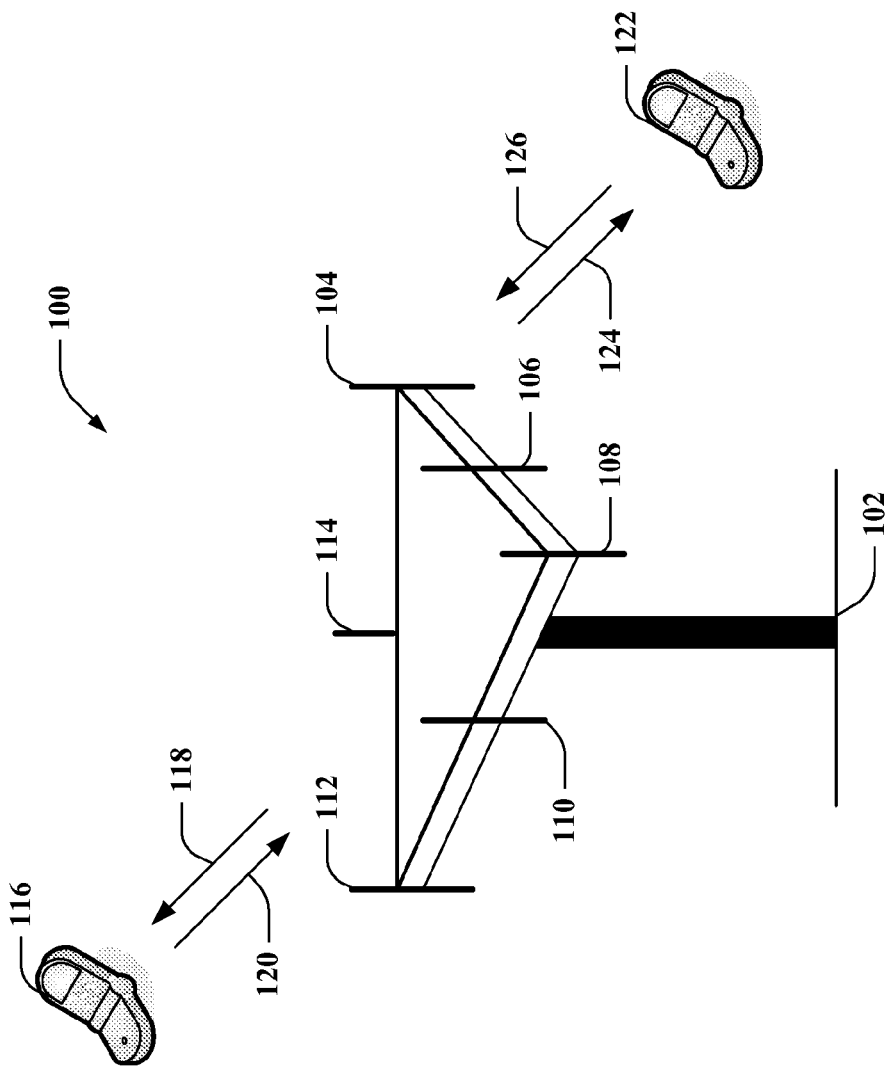
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "component," "engine," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting—Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can enhance signal separation within a wireless communications environment, and in general, any suitable OFDM-based network. The described systems and/or methods can generate a carrier spacing that can be employed in order to ensure orthogonality between tones from two or more carriers. In particular, the subject innovation can employ a carrier spacing that provides orthogonality between tones from different carriers substantially similar to the orthogonality among tones within a given carrier (e.g., one carrier). The claimed subject matter can evaluate a tone spacing from two or more carriers and utilize a carrier spacing that is an integer multiple of the tone spacing for the two or more carriers. Additionally, the two or more carriers can be ensured to having substantially similar OFDM symbol durations as well as being time synchronized (e.g., having a minimal time offset). In addition, the claimed subject matter can leverage a carrier raster related to a network in order to calculate the carrier spacing, wherein a least common multiple of the carrier raster and the tone spacing can define the carrier spacing. Moreover, it is to be appreciated that the carrier raster can include a tolerance, wherein the least common multiple of the carrier raster and the tone spacing can be set in accordance with the tolerance. Furthermore, it is to be appreciated that the subject innovation can be utilized with cellular networks, wireless networks, Wireless Local Area Network (WiLAN), WiFi, router-based networks, OFDM-based networks, peer-to-peer networks, OFDM-like systems, a network that splits bandwidth into tones, and/or any other suitable network that can employ OFDM techniques.

Figure 2:
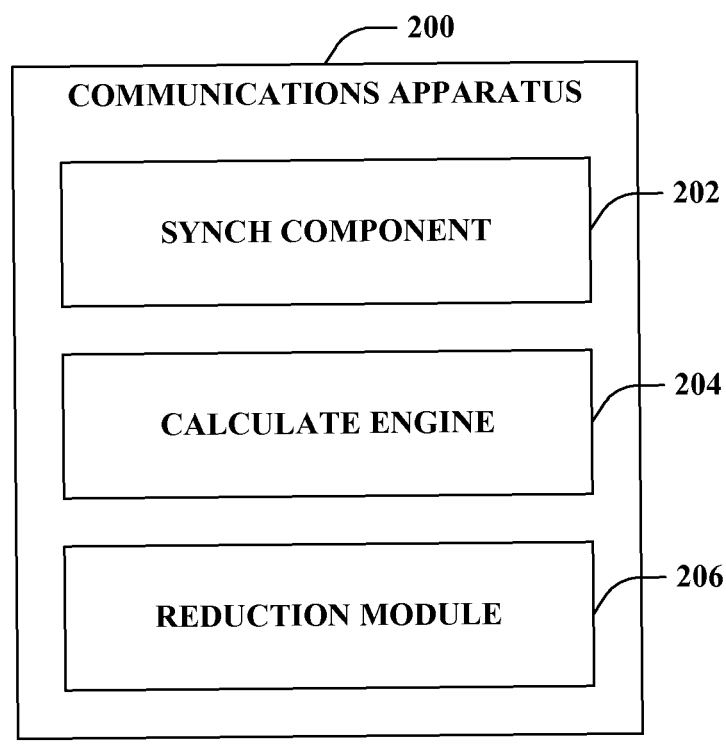
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, a network, an OFDM network, a network that splits bandwidth using tones, or substantially any communications apparatus that receives/transmits data transmitted in a wireless communications environment.

The communications apparatus 200 can include a synch component 202 that can time synchronize two or more carriers in order to ensure minimal time offsets therebetween. The synch component 202 can synchronize a carrier to an absolute time reference, wherein two carriers are synchronized can be employed. It is to be appreciated that the synch component 202 can ensure that the OFDM symbols match between two or more carriers. The minimal time offsets can be a difference between the start of the OFDM symbols from the two or more carriers is not more than the length of the cyclic prefix. It is to be appreciated that the synch component 202 can employ any suitable time synchronization technique. For example, each carrier can be synchronized to a common or shared reference. In another example, the two or more carriers can be synchronized with a satellite navigation system such as Global Positioning System (GPS).

The communications apparatus 200 can further include a calculate engine 204. The calculate engine 204 can generate a carrier spacing for the two or more carriers. In particular, the calculate engine 204 can receive a tone spacing and identify a carrier spacing that is an integer multiple of the tone spacing. In another instance, the calculate engine 204 can receive a tone spacing and a carrier raster and define a carrier spacing that is a least common multiple of the tone spacing and the carrier raster. Moreover, it is to be appreciated that the carrier raster can include a tolerance, wherein the least common multiple of the carrier raster and the tone spacing can be set in accordance with the tolerance. The communication apparatus 200 can include a reduction module 206 that can employ or implement the carrier spacing for the two or more carriers. The reduction module 206 can employ the carrier spacing to enable signal separation based upon the carrier spacing providing othogonality between tones from different carriers.

Moreover, although not shown, it is to be appreciated that communications apparatus 200 can include memory that retains instructions with respect to verifying an Orthogonal Frequency-Division Multiplexing (OFDM) symbol duration between two or more carriers, employing a time synchronization to ensure signal receipt from the two or more carriers have a minimal time offset, receiving a tone spacing from the two or more carriers, implementing a carrier spacing for the two or more carriers, wherein the carrier spacing is an integer multiple of the tone spacing, receiving the implemented carrier spacing with at least one of a base station, a serving base station, a target base station, a network, a server, a mobile device, a user equipment, an OFDM network, or an eNode B, and the like. Further, communications apparatus 200 can include a processor that may be utilized in connection with executing instructions (e.g., instructions retained within memory, instructions obtained from a disparate source, . . . ).

Figure 3:
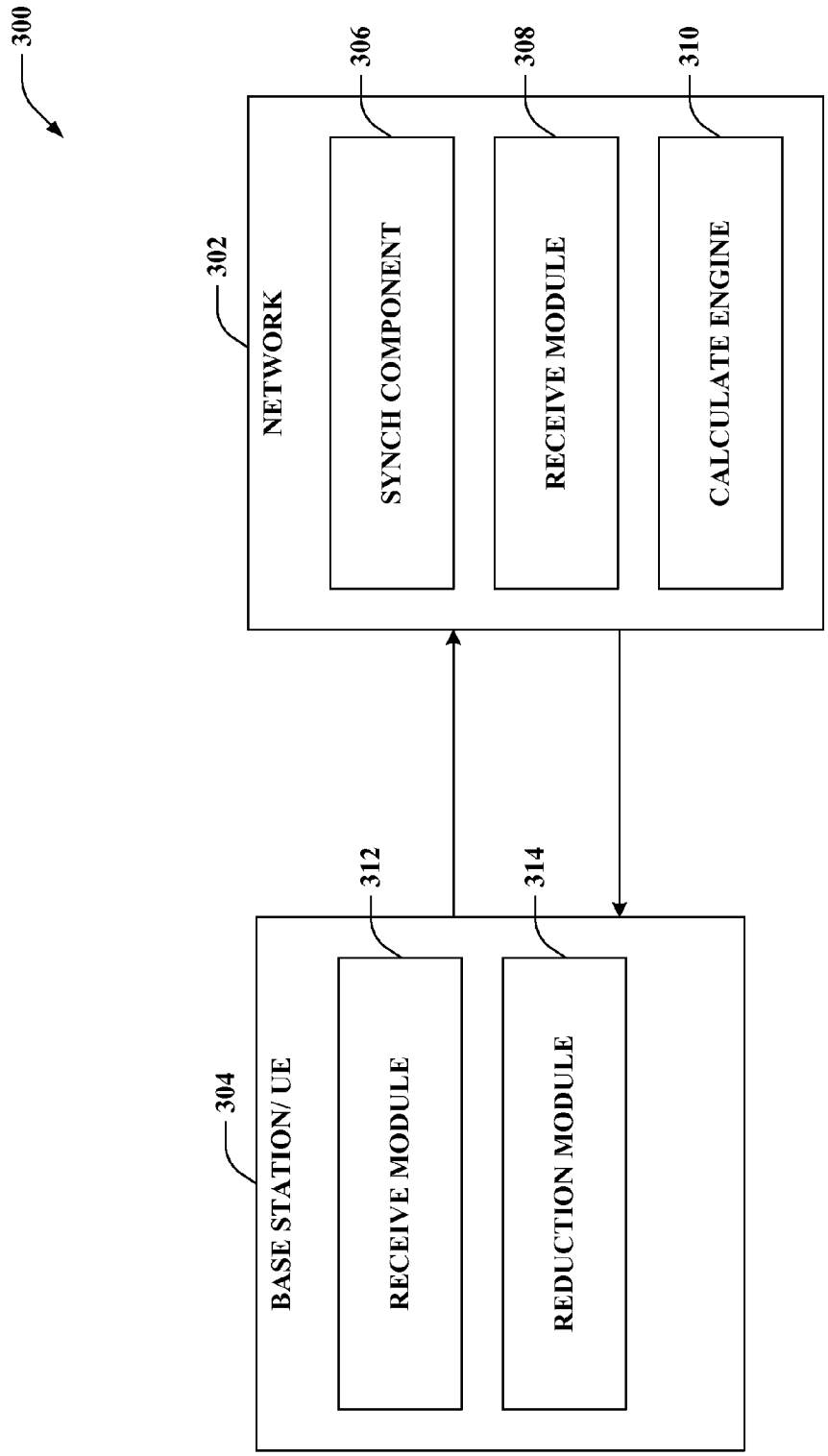
FIG. 3 is an illustration of an example wireless communications system that facilitates implementing a frequency offset between adjacent carriers based upon carrier tone(s).

Now referring to FIG. 3, illustrated is a wireless communications system 300 that can implement a frequency offset between adjacent carriers based upon carrier tone(s). The system 300 includes a network 302 that communicates with a user equipment (UE) and/or base station 304 (and/or any number of disparate base stations and/or mobile devices (not shown)). Network 302 can transmit information to base station/UE 304 over a hard connection, a forward link channel; further network 302 can receive information from base station/UE 304 over a hard connection, a reverse link channel. Moreover, system 300 can be a MIMO system. Additionally, the system 300 can operate in an OFDMA wireless network, a 3GPP LTE wireless network, etc. Also, the components and functionalities shown and described below in the network 302 can be present in the base station/UE 304 as well and vice versa, in one example; the configuration depicted excludes these components for ease of explanation. In general, the network 302 can be any suitable network such as, but not limited to, cellular networks, wireless networks, WiLAN, WiFi, router-based networks, OFDM-based networks, peer-to-peer networks, OFDM-like systems, a network that splits bandwidth into tones, and/or any other suitable network that can employ OFDM techniques.

Network 302 can include a synch component 306 that can verify OFDM symbol duration between two or more carriers. In particular, the synch component 306 can evaluate two or more carriers in order to determine whether the OFDM symbol duration is substantially similar between two or more carriers and/or whether compatible systems are deployed on adjacent carriers. The synch component 306 can further enforce time synchronization between the two or more carriers in order to produce a minimal or small time offset. The synch component 306 can utilize any suitable time synchronization technique such as, but not limited to, satellite synchronization (e.g., GPS, etc.), time/clock synchronization, etc.

The network 302 can further include a receive module 308 that can collect a tone spacing from two or more carriers. Moreover, the receive module 308 can collect a carrier raster from any suitable network such as, but not limited to, an LTE network. The network 302 can include a calculate engine 310 that can identify a carrier spacing based at least in part upon the tone spacing, wherein the carrier spacing is an integer multiple of the tone spacing. In addition, the calculate engine 310 can define the carrier spacing (e.g., frequency offset between adjacent carriers, etc.) as a least common multiple of between the tone spacing and the carrier raster. Moreover, it is to be appreciated that the carrier raster can include a tolerance, wherein the least common multiple of the carrier raster and the tone spacing can be set in accordance with the tolerance.

Base station/UE 304 includes a receive module 312. The receive module 312 can collect the defined or identified carrier spacing. The base station/UE 304 can further include a reduction module 314 that can utilize the carrier spacing in order to facilitate separating signals within a communications environment. For instance, the communications environment can be, but is not limited to being, an OFDM-based network, a WiLAN, WiFi, peer-to-peer network, a cellular network, a network that utilizes tones to split bandwidth, and the like.

Moreover, although not shown, it is to be appreciated that network 302 can include memory that retains instructions with respect to verifying an Orthogonal Frequency-Division Multiplexing (OFDM) symbol duration between two or more carriers, employing a time synchronization to ensure signal receipt from the two or more carriers have a minimal time offset, receiving a tone spacing from the two or more carriers, implementing a carrier spacing for the two or more carriers, wherein the carrier spacing is an integer multiple of the tone spacing, transmitting the implemented carrier spacing with at least one of a base station, a serving base station, a target base station, a network, a server, a mobile device, a user equipment, an OFDM network, or an eNode B, and the like. Further, network 302 can include a processor that may be utilized in connection with executing instructions (e.g., instructions retained within memory, instructions obtained from a disparate source, . . . ).

Figure 4:
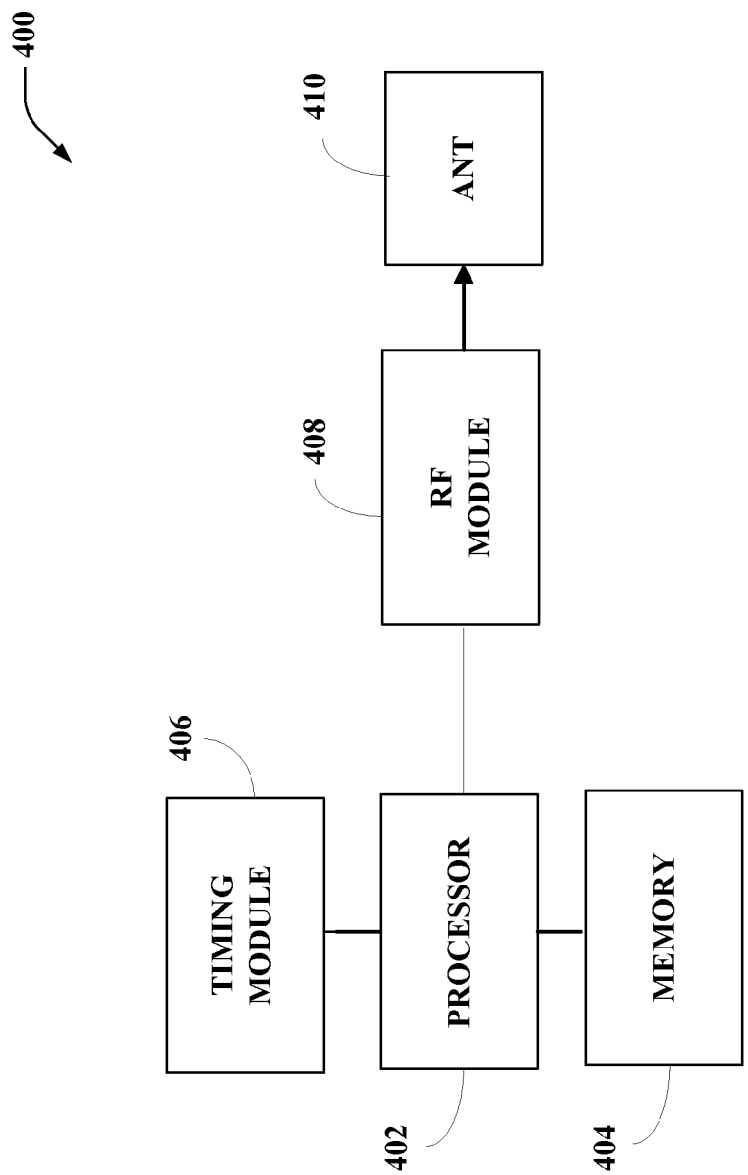
FIG. 4 is an illustration of an example system that utilizes a transmitter in accordance with the subject innovation.

Now referring to FIG. 4, an example wireless communications system 400 is illustrated according to one or more aspects of the subject disclosure. In particular, FIG. 4 illustrates the system 400 that includes a transmitter 300 configured to operate in accordance the subject innovation. The principles used in traditional OFDM systems regarding carrier spacing can be applied to signals associated with different carrier frequencies. The carrier frequency referred to is the center (DC) frequency among the tones used for the signal transmission from a given transmission source, such as a base station. Carrier frequency is also sometimes referred to as RF or Radio-Frequency carrier frequency or (RF) channel. Different base stations can use different carrier frequencies in order to reduce the interference between their respective transmitted signals. This is especially important when the base stations belong to different wireless operators, whose deployments are not coordinated (the base stations are not co-located). In this case, the user equipment (UE) may be receiving a weak desired signal in the presence of a strong signal from another carrier. The two signals occupying different carriers is essential for enabling the reception of the weaker desired signal.

Traditionally, the signal separation of different carriers is performed by filtering at a receiver. Such filtering requires hardware or software support, which increases the receiver cost and complexity. The demand on the required filtering can be reduced if the same type of orthogonality between tones from different carriers is used as the orthogonality among tones within a given carrier described above. This means that the following conditions are generally satisfied:

1. The OFDM symbol duration in the two carriers is similar
2. The UE receives the signal from two carriers with small time offsets. Small time offset means that the difference between the start of the OFDM symbols from the two carriers is not more than the length of the cyclic prefix.
3. The frequency offset between the tones of the two carriers is related to the reciprocal of the OFDM symbol duration. Typically, this can be achieved by making the carrier spacing, i.e. the frequency offset between adjacent carriers, an integer multiple of the tone spacing within the carriers.

Condition 1 is often automatically satisfied by deploying compatible systems on adjacent carriers. Condition 2 can be achieved by time synchronization. An example is when the system time associated with each carrier is synchronized to a common reference, for example synchronized to a satellite navigation system, such as GPS. There are other time synchronization methods as well. Condition 3 can be achieved by an appropriate selection of the carrier spacing. Sometimes carrier spacing is dictated by air interface standards, but even in this case, fine carrier offset adjustment may be possible because of the allowed frequency range for frequency reference uncertainty.

So far, the method of carrier spacing optimization for the downlink (DL) has been discussed. The same benefit is also applicable to the uplink (UL). As a matter of fact, since the DL-UL frequency separation (zero for TDD and non-zero for FDD) is typically the same for adjacent carriers, the optimum DL carrier spacing automatically ensures optimum UL carrier spacing as well.

Consider a mobile WiMAX system with 3 carrier frequencies as an example: Condition 1 is naturally satisfied since it is assumed that all 3 carriers transmit the same type of OFDMA signal, as specified by a common standard. Since, for a given carrier frequency, mobile WiMAX is typically deployed synchronously, condition 2 is typically met. Condition 3 is harder to meet, since, in one embodiment, the carrier frequency spacing is defined in one standard as steps of 250 kHz, but the tone-spacing for a typical 10 MHz channel bandwidth is 11.2 MHz/1024=10.9375 kHz. Considering 3 base stations with the following nominal carrier frequencies (separated by 10 Mhz):

1. A=2.496 GHz
2. B=2.506 GHz.
3. C=2.516 GHz

Assuming these base stations are operated by the same provider or coordination between different providers, base stations A can increase its reference oscillator's frequency such that its actual center frequency is A'=2.496 GHz+3.124 kHz. Base station C can lower its reference oscillator's frequency such that its actual frequency is C'=2.516 GHz-3.124 kHz. The deviations in the actual frequencies for base stations B & C is around 1.2 ppm and therefore still within the allowed range of ±2 ppm [2,3]. By changing the frequencies of A & C the carrier frequency difference between A & B and B & C is reduced to 9,996,875 Hz which is an integer multiple of the tone spacing (9,996,875 Hz=914×10.9375 kHz).

Turning to the system 400, a processor 402 contains hardware and/or software necessary to carry out the steps needed to perform the operations for providing orthoganality in an OFDM wireless communication system having a second transmitter using a different carrier frequency than the one used by transmitter 400 (e.g., also referred to as system 400). Processor 402 is typically coupled to memory 404, which provides computer-readable instructions for carrying out the afore-mentioned process. Memory 404 may also be used to store other pertinent information for transmitter 400 to operate. Timing module 406 comprises hardware and/or software needed to coordinate timing between transmitter 400 and a second transmitter. For example, timing module 406 could comprise a GPS module for receiving timing information from a constellation of earth-orbiting satellites. Timing module 406 could alternatively comprise a timer that is periodically updated with an overall system time. In yet another embodiment, the functionality of timing module 406 could be incorporated into processor 402 or any other functional block within transmitter 400.

In any case, the timing information from timing module 406 is sent to processor 402, so that processor 402 may coordinate transmission timing between it and a second transmitter. For instance, processor 402 is configured to process data for transmission by converting the data into OFDM symbols having a similar OFDM symbol duration to what is used in a second transmitter. In addition, processor 402 provides a frequency offset between OFDM tones used by its carrier frequency. This frequency offset is typically the same or similar to a frequency offset between OFDM tones used by the second transmitter. Typically, the two carrier frequencies relate to a reciprocal of the OFDM symbol duration. The OFDM modulated data is then transmitted using well-known RF techniques using RF module 408 and antenna(s) 410 within a predetermined time period from when a second signal is transmitted from the second base station.

Figure 5:
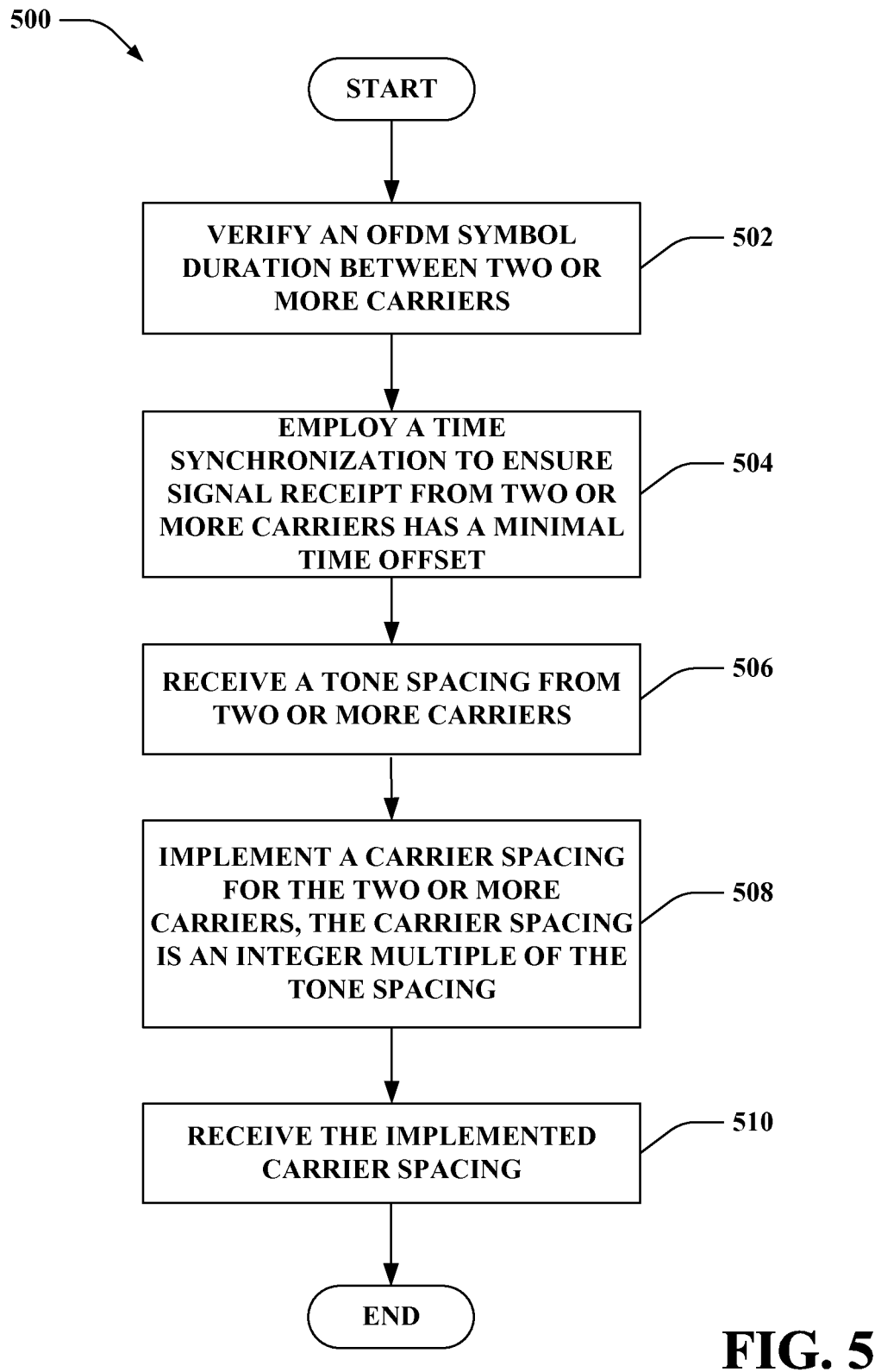
FIG. 5 is an illustration of an example methodology that calculates a carrier spacing in order to mitigate signal separation from two or more carriers.
Figure 6:
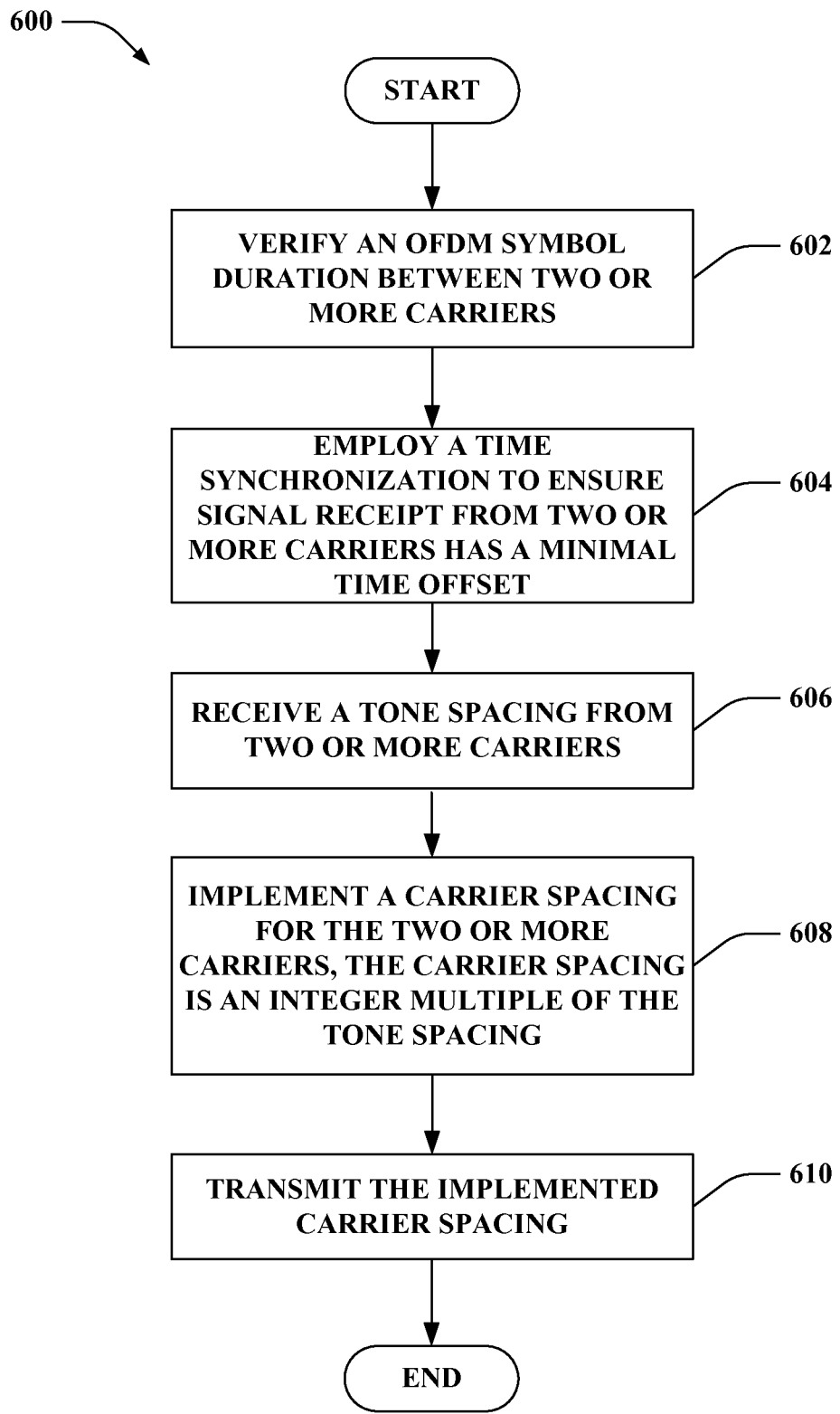
FIG. 6 is an illustration of an example methodology that identifies a frequency offset between adjacent carriers by utilizing an integer multiple of tone spacing.

Referring to FIGS. 5-6, methodologies relating to providing uplink timing control while reducing overhead and power consumption are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates calculating a carrier spacing in order to mitigate signal separation from two or more carriers. At reference numeral 502, an Othogonal Frequency-Division Multiplexing (OFDM) symbol duration can be verified between two or more carriers, wherein the verification can ensure matching between the OFDM symbols between two or more carriers. At reference numeral 504, a time synchronization can be employed to ensure signal receipt from two or more carriers has a minimal offset. At reference numeral 506, a tone spacing can be received from the two or more carriers. At reference numeral 508, a carrier spacing for the two or more carriers can be implemented, wherein the carrier spacing is an integer multiple of the tone spacing. It is to be appreciated that the carrier spacing can further be calculated based upon a least common multiple of a carrier raster and the tone spacing. Moreover, it is to be appreciated that the carrier raster can include a tolerance, wherein the least common multiple of the carrier raster and the tone spacing can be set in accordance with the tolerance. At reference numeral 510, the implemented carrier spacing can be received.

Now referring to FIG. 6, a methodology 600 that facilitates identifying a frequency offset between adjacent carriers by utilizing an integer multiple of tone spacing. At reference numeral 602, an Othogonal Frequency-Division Multiplexing (OFDM) symbol duration can be verified between two or more carriers, wherein the verification is a matching between OFDM symbols for two or more carriers. At reference numeral 604, a time synchronization can be employed to ensure signal receipt from two or more carriers has a minimal offset. At reference numeral 606, a tone spacing can be received from the two or more carriers. At reference numeral 608, a carrier spacing for the two or more carriers can be implemented, wherein the carrier spacing is an integer multiple of the tone spacing. It is to be appreciated that the carrier spacing can further be calculated based upon a least common multiple of a carrier raster and the tone spacing. Moreover, it is to be appreciated that the carrier raster can include a tolerance, wherein the least common multiple of the carrier raster and the tone spacing can be set in accordance with the tolerance. At reference numeral 610, the implemented carrier spacing can be transmitted.

Figure 7:
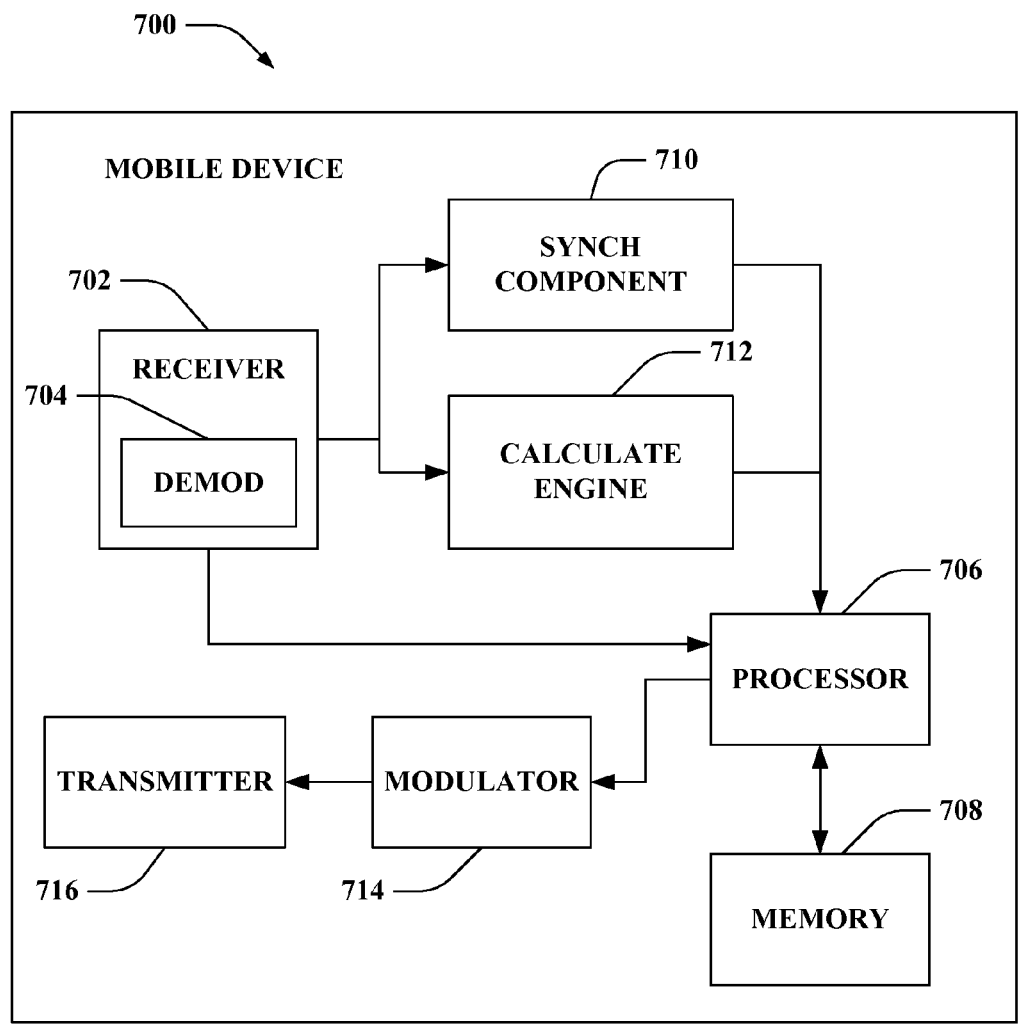
FIG. 7 is an illustration of an example mobile device that facilitates signal separation utilizing carrier spacing in a wireless communication system.

FIG. 7 is an illustration of a mobile device 700 that facilitates signal separation utilizing carrier spacing in a wireless communication system. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to at least one of a synch component 710 or a calculate engine 712. The synch component 710 can ensure that various conditions are met in order to implement a carrier spacing. For instance, the synch component 710 can verify that OFDM symbol duration between two or more carriers is substantially similar. In addition, the synch component 710 can ensure time synchronization between two or more carriers. The calculate engine 712 can determine a carrier spacing, wherein the carrier spacing can be an integer multiple of a tone spacing related to two or more carriers. In another example, the calculate engine 712 can determine the carrier spacing based on a least common multiple of the tone spacing and a carrier raster.

Mobile device 700 still further comprises a modulator 714 and transmitter 716 that respectively modulate and transmit signals to, for instance, a base station, another mobile device, etc. Although depicted as being separate from the processor 706, it is to be appreciated that the synch component 710, calculate engine 712, demodulator 704, and/or modulator 714 can be part of the processor 706 or multiple processors (not shown).

Figure 8:
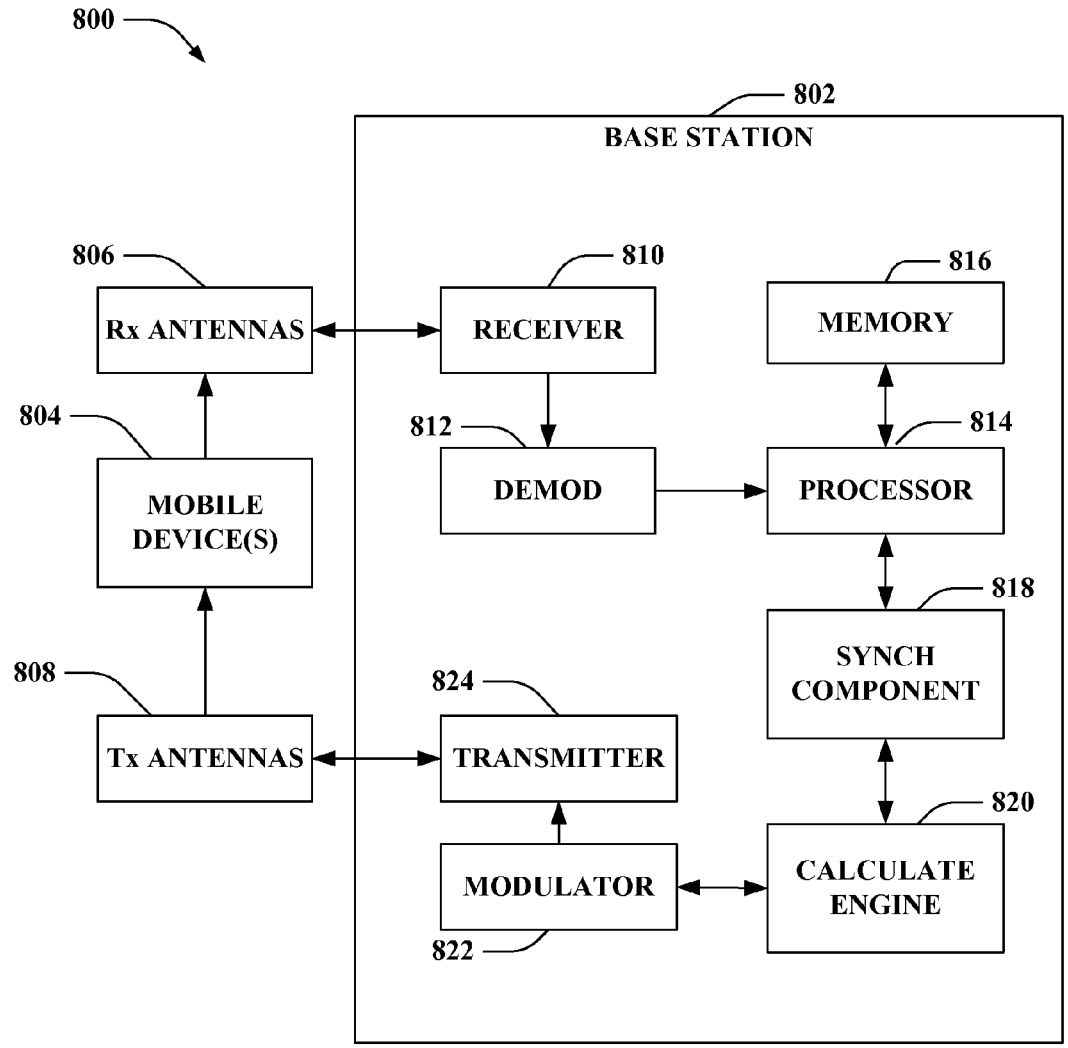
FIG. 8 is an illustration of an example system that facilitates employing orthogonality between tones in two or more carriers in a wireless communication environment.

FIG. 8 is an illustration of a system 800 that facilitates employing orthogonality between tones in two or more carriers as described supra. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a timing adjustment determiner 818 that can ascertain if mobile devices 804 require timing updates. Moreover, the processor 814 can be coupled to a timing adjustment evaluator 820 that can generate timing adjustment commands that update timing of mobile device 804 according to the identified need.

Moreover, the processor 814 can be coupled to at least one of a synch component 818 or a calculate engine 820. The synch component 710 can ensure that various conditions are met in order to implement a carrier spacing. For instance, the synch component 710 can verify that OFDM symbol duration between two or more carriers is substantially similar. In addition, the synch component 710 can ensure time synchronization between two or more carriers. The calculate engine 712 can determine a carrier spacing, wherein the carrier spacing can be an integer multiple of a tone spacing related to two or more carriers. In another example, the calculate engine 712 can determine the carrier spacing based on a least common multiple of the tone spacing and a carrier raster. Furthermore, although depicted as being separate from the processor 814, it is to be appreciated that the synch component 818, calculate engine 820, demodulator 812, and/or modulator 822 can be part of the processor 814 or multiple processors (not shown).

Figure 9:
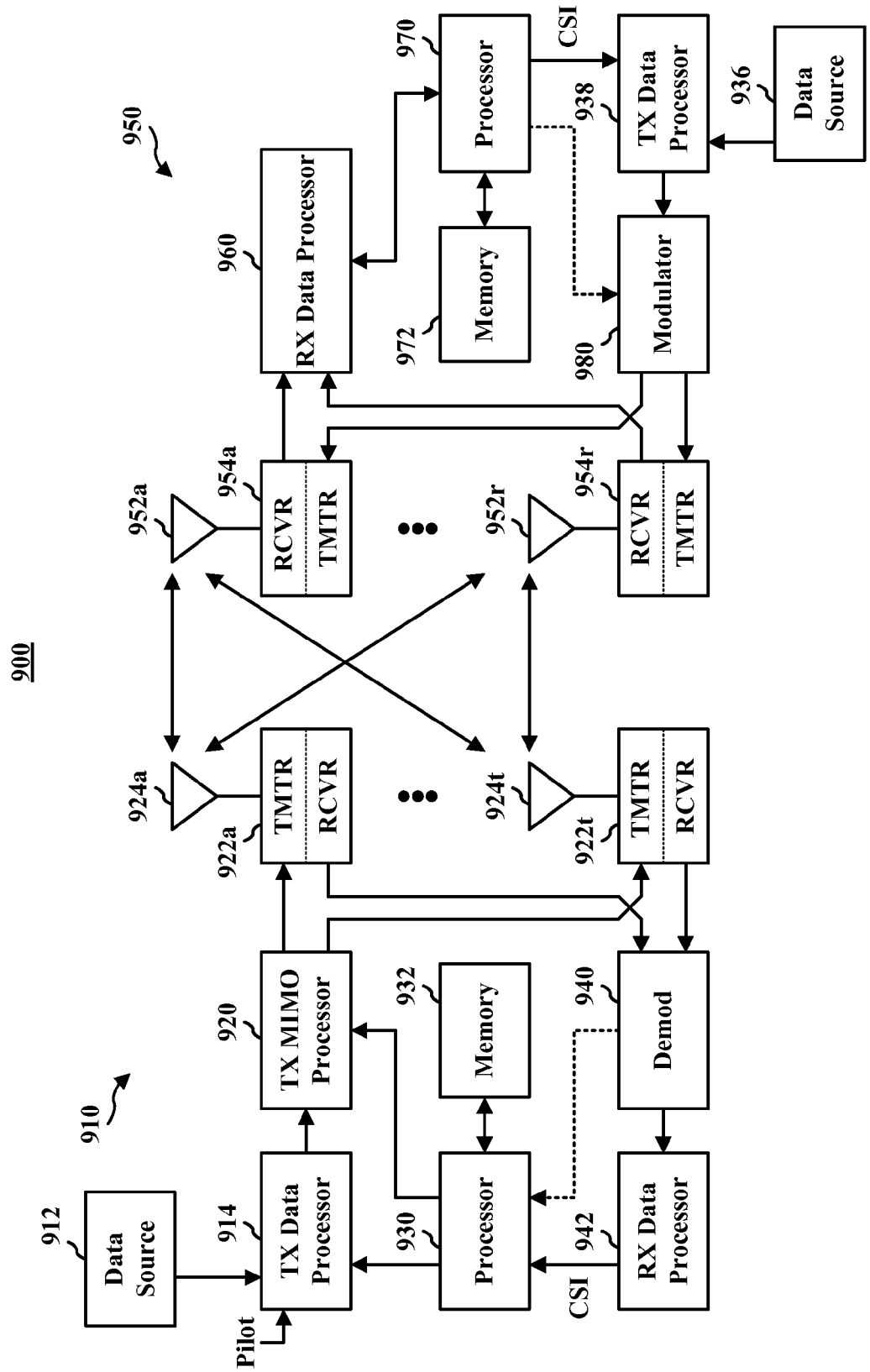
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-4 and 7-8), and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
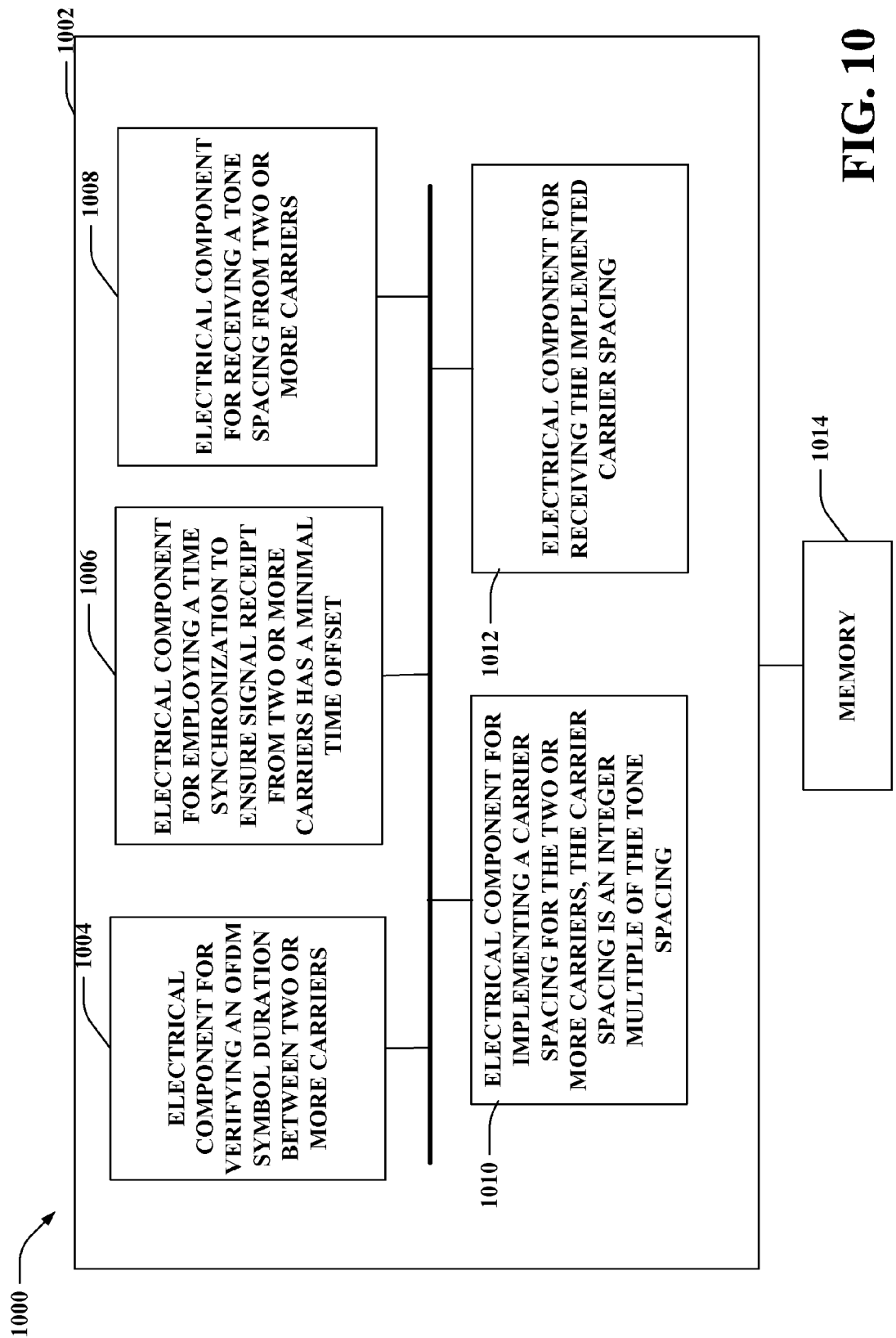
FIG. 10 is an illustration of an example system that facilitates calculating a carrier spacing in order to mitigate signal separation from two or more carriers.

With reference to FIG. 10, illustrated is a system 1000 that facilitates calculating a carrier spacing in order to mitigate signal separation from two or more carriers. For example, system 1000 can reside at least partially within a base station, mobile device, network, OFDM network, user equipment, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. System 1000 includes a logical grouping 1002 of electrical components that facilitate signal separation within a wireless communications network(s). Logical grouping 1002 can include an electrical component for verifying an Orthogonal Frequency-Division Multiplexing (OFDM) symbol duration between two or more carriers 1004. Moreover, logical grouping 1002 can include an electrical component for employing a time synchronization to ensure signal receipt from the two or more carriers have a minimal time offset 1006. Further, logical grouping 1002 can comprise an electrical component for receiving a tone spacing from the two or more carriers 1008. In addition, logical grouping 1002 can include an electrical component for implementing a carrier spacing for the two or more carriers, wherein the carrier spacing is an integer multiple of the tone spacing 1010. The logical grouping 1002 can further include an electrical component for receiving the implemented carrier spacing 1012. Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

Figure 11:
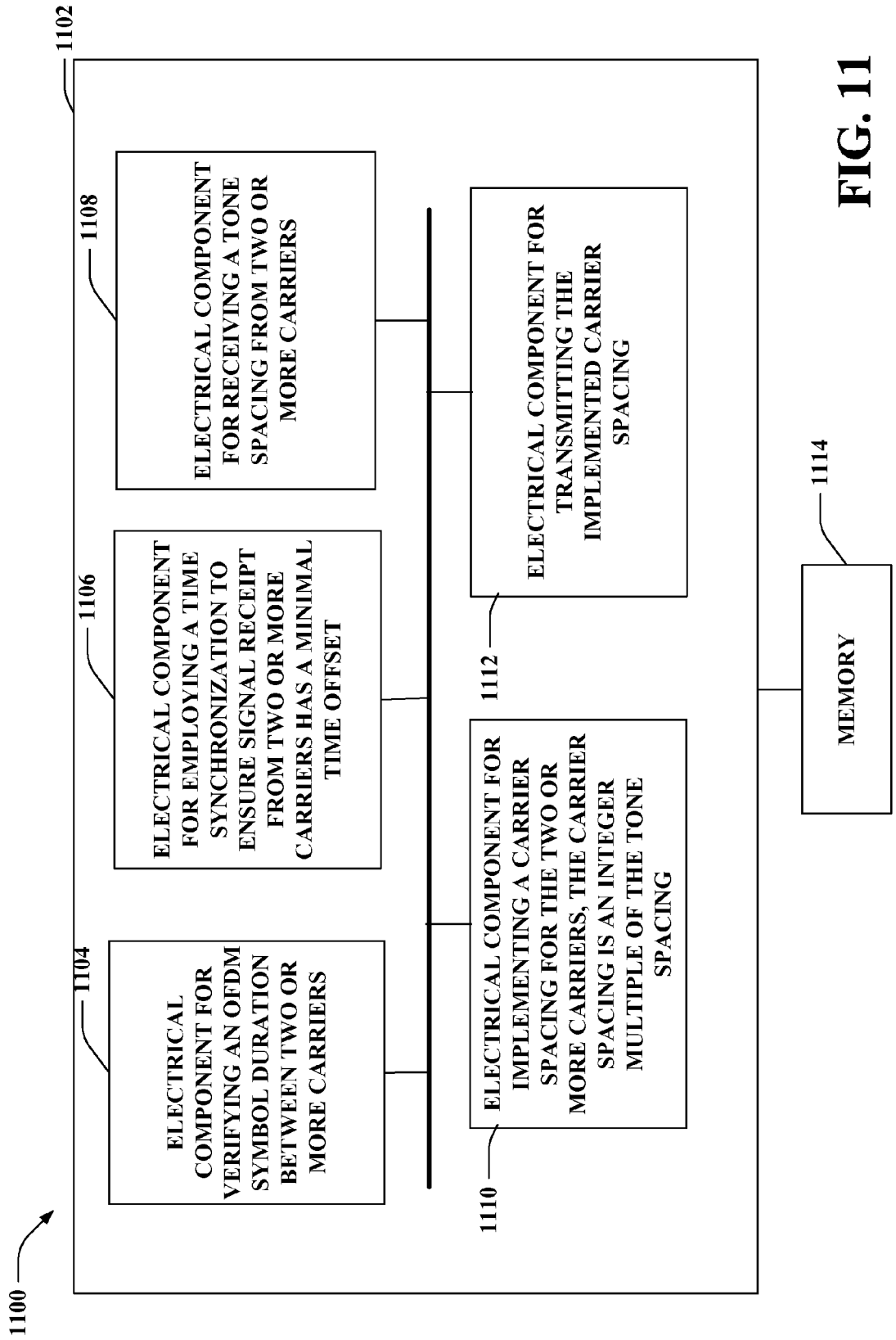
FIG. 11 is an illustration of an example system that identifies a frequency offset between adjacent carriers by utilizing an integer multiple of tone spacing in a wireless communication environment.

Turning to FIG. 11, illustrated is a system 1100 that identifies a frequency offset between adjacent carriers by utilizing an integer multiple of tone spacing in a wireless communications network. System 1100 can reside within a base station, user equipment, network, OFDM network, mobile device, etc., for instance. As depicted, system 1100 includes functional blocks that can represent functions implemented by a processor, software, or combination thereof (e.g., firmware). System 1100 includes a logical grouping 1102 of electrical components that facilitate signal separation within a wireless communications network(s). Logical grouping 1102 can include an electrical component for verifying an Orthogonal Frequency-Division Multiplexing (OFDM) symbol duration between two or more carriers 1104. Moreover, logical grouping 1102 can include an electrical component for employing a time synchronization to ensure signal receipt from the two or more carriers have a minimal time offset 1106. Further, logical grouping 1102 can comprise an electrical component for receiving a tone spacing from the two or more carriers 1108. In addition, logical grouping 1102 can include an electrical component for implementing a carrier spacing for the two or more carriers, wherein the carrier spacing is an integer multiple of the tone spacing 1110. The logical grouping 1102 can further include an electrical component for transmitting the implemented carrier spacing 1112. Additionally, system 1100 can include a memory 1114 that retains instructions for executing functions associated with electrical components 1104, 1106, 1108 1110, and 1112. While shown as being external to memory 1114, it is to be understood that electrical components 1104, 1106, 1108 1110, and 1112 can exist within memory 1114.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates separating signals within a wireless communications environment, comprising:
   verifying an Orthogonal Frequency-Division Multiplexing (OFDM) symbol duration between two or more carriers associated with an OFDM network, wherein verifying ensures a matching between the OFDM symbol duration between two or more carriers;
   employing a time synchronization to ensure signal receipt from the two or more carriers have a minimal time offset;
   receiving a tone spacing from the two or more carriers; and
   implementing a carrier spacing for the two or more carriers, wherein the carrier spacing is an integer multiple of the tone spacing.

2. The method of claim 1, further comprising receiving the implemented carrier spacing with at least one of a base station, a serving base station, a target base station, a network, a server, a mobile device, a user equipment, an OFDM network, or an eNode B.

3. The method of claim 1, further comprising transmitting the implemented carrier spacing from at least one of a base station, a serving base station, a target base station, a network, a server, a mobile device, a user equipment, an OFDM network, or an eNode B.

4. The method of claim 1, wherein the OFDM network is at least one of a wireless network, a WiLAN, a WiFi, a router-based network, or a peer-to-peer network.

5. The method of claim 1, further comprising evaluating a network to identify a carrier raster, wherein the carrier raster is related to a network and includes a tolerance.

6. The method of claim 5, further comprising calculating the carrier spacing based upon identifying a least common multiple between the carrier raster and the tone spacing, wherein the common multiple takes in account the tolerance for flexibility.

7. The method of claim 1, further comprising employing the carrier spacing within network in order to separate signals from two or more carriers.

8. The method of claim 1, further comprising utilizing the carrier spacing with at least one of a base station or a user equipment (UE) in order to separate signals from two or more carriers.

9. The method of claim 1, wherein the time synchronization is a satellite navigation system technique.

10. The method of claim 1, further comprising verifying OFDM symbol duration is substantially similar by evaluating whether compatibility exists between two or more deployed systems on adjacent carriers.

11. A wireless communications apparatus, comprising:
at least one processor configured to:
verify an Orthogonal Frequency-Division Multiplexing (OFDM) symbol duration between two or more carriers;
employ a time synchronization to ensure signal receipt from the two or more carriers have a minimal time offset;
receive a tone spacing from the two or more carriers; and
implement a carrier spacing for the two or more carriers, wherein the carrier spacing is an integer multiple of the tone spacing; and
a memory coupled to the at least one processor.

12. The wireless communications apparatus of claim 11, further comprising at least one processor configured to receive the implemented carrier spacing with at least one of a base station, a serving base station, a target base station, a network, a server, a mobile device, a user equipment, an OFDM network, or an eNode B.

13. The wireless communications apparatus of claim 11, further comprising at least one processor configured to transmit the implemented carrier spacing from at least one of a base station, a serving base station, a target base station, a network, a server, a mobile device, a user equipment, an OFDM network, or an eNode B.

14. The wireless communications apparatus of claim 11, wherein the OFDM network is at least one of a wireless network, a WiLAN, a WiFi, a router-based network, or a peer-to-peer network.

15. The wireless communications apparatus of claim 11, further comprising at least one processor configured to evaluate a network to identify a carrier raster, wherein the carrier raster is related to a network and includes a tolerance.

16. The wireless communications apparatus of claim 15, further comprising at least one processor configured to calculate the carrier spacing based upon identifying a least common multiple between the carrier raster and the tone spacing, wherein the common multiple takes in account the tolerance for flexibility.

17. The wireless communications apparatus of claim 11, further comprising at least one processor configured to employ the carrier spacing within network in order to separate signals from two or more carriers.

18. The wireless communications apparatus of claim 11, further comprising at least one processor configured to utilize the carrier spacing with at least one of a base station or a user equipment (UE) in order to separate signals from two or more carriers.

19. The wireless communications apparatus of claim 11, wherein the time synchronization is a satellite navigation system technique.

20. The wireless communications apparatus of claim 11, further comprising at least one processor configured to verify OFDM symbol duration is substantially similar by evaluating whether compatibility exists between two or more deployed systems on adjacent carriers.

21. A wireless communications apparatus that enables separation of signals within a wireless communications environment, comprising:
means for verifying an Orthogonal Frequency-Division Multiplexing (OFDM) symbol duration between two or more carriers associated with an OFDM network;
means for employing a time synchronization to ensure signal receipt from the two or more carriers have a minimal time offset;
means for receiving a tone spacing from the two or more carriers; and
means for implementing a carrier spacing for the two or more carriers, wherein the carrier spacing is an integer multiple of the tone spacing.

22. The wireless communications apparatus of claim 21, wherein the implemented carrier spacing is received with at least one of a base station, a serving base station, a target base station, a network, a server, a mobile device, a user equipment, an OFDM network, or an eNode B.

23. The wireless communications apparatus of claim 21, wherein the implemented carrier spacing is transmitted from at least one of a base station, a serving base station, a target base station, a network, a server, a mobile device, a user equipment, an OFDM network, or an eNode B.

24. The wireless communications apparatus of claim 21, wherein the OFDM network is at least one of a wireless network, a WiLAN, a WiFi, a router-based network, or a peer-to-peer network.

25. The wireless communications apparatus of claim 21, wherein a network is evaluated to identify a carrier raster, wherein the carrier raster is related to a network and includes a tolerance.

26. The wireless communications apparatus of claim 25, wherein the carrier spacing is calculated based upon identifying a least common multiple between the carrier raster and the tone spacing, wherein the common multiple takes in account the tolerance for flexibility.

27. The wireless communications apparatus of claim 21, wherein the carrier spacing is employed within network in order to separate signals from two or more carriers.

28. The wireless communications apparatus of claim 21, wherein the carrier spacing is utilized with at least one of a base station or a user equipment (UE) in order to separate signals from two or more carriers.

29. The wireless communications apparatus of claim 21, wherein the time synchronization is a satellite navigation system technique.

30. The wireless communications apparatus of claim 21, wherein OFDM symbol duration is verified to be substantially similar by evaluating whether compatibility exists between two or more deployed systems on adjacent carriers.

31. A computer program product, comprising:
a computer-readable medium comprising:
code for causing at least one computer to verify an Orthogonal Frequency-Division Multiplexing (OFDM) symbol duration between two or more carriers;
code for causing at least one computer to employ a time synchronization to ensure signal receipt from the two or more carriers have a minimal time offset;
code for causing at least one computer to receive a tone spacing from the two or more carriers; and
code for causing at least one computer to implement a carrier spacing for the two or more carriers, wherein the carrier spacing is an integer multiple of the tone spacing.

32. The computer program product of claim 31, the computer-readable medium further comprising code for causing at least one computer to receive the implemented carrier spacing with at least one of a base station, a serving base station, a target base station, a network, a server, a mobile device, a user equipment, an OFDM network, or an eNode B.

33. The computer program product of claim 31, the computer-readable medium further comprising code for causing at least one computer to transmit the implemented carrier spacing from at least one of a base station, a serving base station, a target base station, a network, a server, a mobile device, a user equipment, an OFDM network, or an eNode B.

34. The computer program product of claim 31, wherein the OFDM network is at least one of a wireless network, a WiLAN, a WiFi, a router-based network, or a peer-to-peer network.

35. The computer program product of claim 31, the computer-readable medium further comprising code for causing at least one computer to evaluate a network to identify a carrier raster, wherein the carrier raster is related to a network and includes a tolerance.

36. The computer program product of claim 35, the computer-readable medium further comprising code for causing at least one computer to calculate the carrier spacing based upon identifying a least common multiple between the carrier raster and the tone spacing, wherein the common multiple takes in account the tolerance for flexibility.

37. The computer program product of claim 31, the computer-readable medium further comprising code for causing at least one computer to employ the carrier spacing within network in order to separate signals from two or more carriers.

38. The computer program product of claim 31, the computer-readable medium further comprising code for causing at least one computer to utilize the carrier spacing with at least one of a base station or a user equipment (UE) in order to separate signals from two or more carriers.

39. The computer program product of claim 31, wherein the time synchronization is a satellite navigation system technique.

40. The computer program product of claim 31, the computer-readable medium further comprising code for causing at least one computer to verify OFDM symbol duration is substantially similar by evaluating whether compatibility exists between two or more deployed systems on adjacent carriers.

\* \* \* \* \*